United States Patent [19]

Humphrey et al.

[11] Patent Number: 5,330,654
[45] Date of Patent: Jul. 19, 1994

[54] FLAVOR CONCENTRATES AND THEIR PRODUCTION

[75] Inventors: Anthony M. Humphrey, Chorleywood; Gerald E. Usher, Reading, both of Great Britain

[73] Assignee: Bush Boake Allen Limited, Great Britain

[21] Appl. No.: 915,695

[22] PCT Filed: Jan. 18, 1991

[86] PCT No.: PCT/GB91/00077

§ 371 Date: Jul. 24, 1992

§ 102(e) Date: Jul. 24, 1992

[87] PCT Pub. No.: WO91/10373

PCT Pub. Date: Jul. 25, 1991

[30] Foreign Application Priority Data

Jan. 19, 1990 [GB] United Kingdom ............... 9001322

[51] Int. Cl.$^5$ .............................................. B01D 61/04
[52] U.S. Cl. ................................. 210/652; 210/195.2
[58] Field of Search ............... 210/651, 652, 640, 196, 210/195.2; 426/478, 489, 599, 387

[56] References Cited

U.S. PATENT DOCUMENTS

| | | | |
|---|---|---|---|
| 3,552,572 | 1/1971 | Lowe et al. | 210/353 |
| 3,556,970 | 1/1971 | Wallace et al. | 204/181 |
| 3,617,550 | 11/1971 | Elata et al. | 210/23 |
| 3,634,193 | 1/1972 | Lowe et al. | 99/199 |
| 3,743,513 | 7/1973 | Tulin | 99/105 |
| 4,401,678 | 8/1983 | Beaumont | 426/15 |
| 4,491,600 | 1/1985 | Göbel et al. | 426/384 |
| 4,952,751 | 8/1990 | Blume et al. | 210/640 X |

FOREIGN PATENT DOCUMENTS

| | | |
|---|---|---|
| 1092884 | 1/1981 | Canada . |
| 0110638 | 11/1983 | European Pat. Off. . |
| 0174594 | 9/1985 | European Pat. Off. . |
| WO89/01965 | 3/1989 | PCT Int'l Appl. . |
| 1505382 | 3/1978 | United Kingdom . |

OTHER PUBLICATIONS

Sheu, et al., "Preconcentration Of Apple Juice By Reverse Osmosis", *Journal of Food Science*, vol. 48 (1983) pp. 422–429.

*Primary Examiner*—Frank Spear
*Attorney, Agent, or Firm*—Woodcock Washburn Kurtz Mackiewicz & Norris

[57] ABSTRACT

A process for preparing a natural flavor concentrate comprising flavor chemicals derived from a fruit or vegetable juice distillate, wherein the distillate is subjected to reverse osmosis, is disclosed; the distillate is characterized by being substantially free of saccharide and the reverse osmosis is continued until a retentate is obtained that can phase separate, and the retentate is phase separated into an aqueous phase and a substantially anhydrous organic phase which contains a high proportion of the flavor chemicals, and the organic phase is recovered. The natural concentrate derived from the process, which is substantially free of saccharide, is also disclosed.

19 Claims, 2 Drawing Sheets

FLAVOR CONCENTRATES AND THEIR PRODUCTION

This invention relates to the production of flavour concentrates based on fruit or vegetable juices and to novel concentrates. It is of particular value for apple and pear juice concentrates.

It is standard practice to concentrate fruit and vegetable juices to produce concentrates that, upon dilution with water, resemble the original juice. The traditional way of concentration is by distillation. Unfortunately many of the volatile, but very desirable, flavours are taken off in the distillate. It is therefore known to fractionally distil this distillate so as to concentrate some at least of these flavours. The resultant concentrate is still dilute, since it contains more than 90% water and perhaps only around 1% flavour chemicals, and is known by various names. When it is derived from a fruit juice it is known in the trade as a "fruit ester". Usually this concentrate, or the early fractions of the initial distillate, are returned to the concentrated fruit or vegetable juice so as to enhance its flavour.

It might be thought that it would be possible to concentrate the "fruit ester" or other concentrated distillate to a higher concentration by distillation. However this is not practicable because of the boiling points and azeotroping potential of the various components in the weak concentrate. For instance the major component (apart from water) is generally ethanol and although some of the flavour chemicals are more volatile than ethanol many are less volatile, and so concentration by distillation will tend inevitably to give a product in which the amount of flavours, as a proportion of the ethanol content, is reduced. Also, the repeated fractional distillation that would be required to achieve any concentration of the weak concentrate would tend to result in the flavours undergoing chemical changes due to hydrolysis or degradation as a result of the repeated exposure to elevated temperatures.

Although distillation is the normal way of concentrating fruit juices and products derived from them, reverse osmosis has also been proposed. In U.S. Pat. No. 3,743,513 fruit juice is concentrated by distillation but the flavour of the concentrate is improved by blending into the concentrate a separately produced concentrate obtained by reverse osmosis of fruit juice.

In U.S. Pat. No. 4,322,448 a juice is subjected to reverse osmosis to give a concentrated retentate and a permeate that contains desirable flavours and which is then subjected to additional reverse osmosis whereupon the flavours are this time retained in the retentate, rather than in the permeate, and the two retentates are then blended.

In U.S. Pat. No. 4,401,678 a juice is subjected to reverse osmosis to give a retentate of reduced flavour and a permeate containing the flavours. The molecular weight cut-off of the membrane for this purpose is around 200 Dalton.

In EP 174594 a juice is subjected to ultra-filtration to give a retentate and an aqueous permeate containing flavour, and this permeate is then subjected to reverse osmosis to collect the flavours in the retentate, and the two retentates are then combined.

In EP 110638 citrus juice is stripped by steam to give a concentrate and a distillate which is then condensed, limonene oil is separated from the condensate, and the resultant aqueous phase is then concentrated by freezing or reverse osmosis. Juice or sugar is added to the concentrate before the reverse osmosis, and the resultant concentrated product is then blended with the original concentrate.

Thus all these methods are designed to increase the concentration of flavour in the fruit ester component and then to put it back into the original fruit juice concentrate. It has therefore been satisfactory for the concentration of the flavours that is put back into the fruit juice concentrate to be relatively low, for instance below 1% (as indicated above).

The described methods all perform reverse osmosis on a liquor which has a substantial saccharide content, generally sugar but optionally starch, and indeed many of the concentration methods are conducted in practice under conditions so as to give a sugar content of above 30%. This is done partly because at such high sugar concentrations the sugar acts as a preservative. In EP 174594 the reverse osmosis feed is said, in an example, to have a sugar content of only 1.64% but after reverse osmosis the retentate has a sugar content of 14%. The presence of sugar and other saccharides in the retentate makes the reverse osmosis much less efficient.

Another problem with many of the concentrated flavours that are commercially available at present is that they do not give a flavour that resembles the starting juice. Another problem is that even if their initial flavour is satisfactory, it does not withstand cooking, especially microwave cooking, with the result that the cooked product may have a reduced or off-flavour. Synthetic mixtures of chemicals are of course known as flavours, but there is a strong demand for flavours to be wholly derived from natural sources using only physical processes.

There is a particular problem with apple and pear concentrates: none of those that have been proposed have both a high concentration and good flavour properties when diluted.

It would therefore be desirable to be able to produce a concentrate of flavours that does resemble more closely the starting fruit juice or vegetable juice and that preferably is wholly natural and maintains the desired flavour even during microwave or other cooking.

According to the invention, a natural flavour concentrate is made of flavour chemicals derived from a fruit or vegetable juice distillate, the process comprising subjecting the distillate to reverse osmosis, characterised in that the distillate is substantially free of saccharide and reverse osmosis is continued until a retentate is obtained that can phase separate, the retentate is phase separated into an aqueous phase and a substantially anhydrous organic phase that contains a high proportion of the flavour chemicals and the organic phase is recovered.

The organic phase concentrate obtained by this technique can have a higher concentration of flavour chemicals than has been obtainable by prior techniques and the resultant concentrate can give flavours that match closely the naturally occurring fruit or vegetable flavours, and the flavours can be stable during microwave and other cooking.

Concentrates obtainable by the process are themselves novel materials.

A natural concentrate according to the invention is derived essentially by concentration of a fruit or vegetable juice distillate and the concentrate is substantially free of saccharide, upon dilution the concentrate gives substantially the flavour of the original juice, and the concentrate consists essentially of 3 to 40% water, 5 to 60% C1-4 alcohols and aldehydes and 30 to 85% organic chemicals having at least 5 carbon atoms typically selected from aldehydes, alcohols and esters.

The concentrate is substantially free of saccharide and so generally the amount of saccharide is below 5% and usually below 1% by weight of the concentrate.

The proportions of the various components in the concentrate depend in part on the components in the initial fruit juice distillate, from which the concentrate is generally obtained. Some distillates have a low ethanol content and/or a low content of other organics while others have a higher content of such materials. The main flavour compounds in the concentrate are typically esters, alcohols and aldehydes containing at least 5 carbon atoms and so preferably the concentrate has as high a concentration of these as can be conveniently achieved. Typically the amount is at least 50%, for instance 50 to 80% by weight of the concentrate.

The concentrates of the invention are much more concentrated than the flavour concentrate typically available before, which generally has 70 to 90% water whereas in the invention the amount of water is generally below 40%, preferably below 25%. It is unnecessary to make the concentrate wholly anhydrous and so generally it contains at least 5% water. A convenient concentrate has water present in an amount that is approximately the saturation value of water in the organic components of the concentrate.

The remainder of the concentrate i.e. the aqueous phase which has been separated from the organic phase consists mainly of the low molecular weight alcohols and aldehydes such as ethanol, acetaldehyde and butanol. Preferably the amount of these is below 30%, but generally it is at least 10 to 15%.

The concentrate can be derived from any fruit or vegetable from which the distillate has a non-aqueous component containing flavour chemicals but preferably the juice is not citrus and the invention is particularly valuable for obtaining flavour chemicals from apple or pear juice distillate. Thus preferably the concentrate is obtained by concentration of the material known as "apple ester" or "pear ester".

Because apple juice and other fruit juices generally contain a relatively high amount of ethanol it is not possible to obtain the concentrate satisfactorily by freeze concentration or by distillation and so preferably the concentrate is made by the reverse osmosis process of the invention.

The "apple ester" or other distillate that is used as the starting material for the process must be substantially free of saccharide since the overall process of the invention generally involves the distillate being concentrated from 50 to 2,000 times and yet the final product must still be relatively free of saccharide. Accordingly the starting apple ester or other distillate generally contains below 0.05, usually below 0.01 and preferably below 0.001% saccharide. These low concentrations are important since the presence of significant amounts of saccharide will interfere with the high degrees of concentration that are available in the invention. The starting distillate may be a commercially available fruit ester, or the comparable product derived from vegetable juice, typically having a concentration such that 100 liters of the original juice is distilled to give between 0.2 and 2, often around 0.5 to 1, liters of the fruit ester.

An important feature of the invention is the combination of reverse osmosis to remove a substantial proportion of the water while retaining the majority of the flavour chemicals up to a concentration of flavour chemicals which is sufficiently great that useful phase separation can occur. Accordingly the reverse osmosis must be conducted to give a sufficient concentration that useful phase separation can occur. If the original fruit ester or other distillate contains an oil that is liable to separate spontaneously before reverse osmosis (e.g., limonene oil from citrus juice) then it is desirable to phase separate this before subjecting the distillate to reverse osmosis. Preferably the distillate is not a citrus distillate and so this initial separation is usually unnecessary. The phase separation of the reverse osmosis retentate preferably occurs spontaneously but can be caused or promoted by modifying the rententate, e.g. by adjusting its temperature.

The reverse osmosis should be conducted using conventional apparatus but with a membrane having a cut-off that is preferably at or below 150 Dalton, most preferably at or below 100 Dalton. In order to give an adequate flux rate, the liquor is preferably subjected to a pressure of 30 to 80 Bar, generally 50 to 75, most usually around 70 Bar. It is necessary to cool the process liquid in order to keep the temperature to reasonably low levels, preferably below 60° C., most preferably below 45° C. The area of the membrane will be chosen so as to give the desired rate of concentration. The most significant part of the flavour is retained in the retentate in each instance but, because of the high concentration in the final retentate, the aqueous phase that separates from the organic phase will itself have a relatively high concentration of flavour. It is therefore desirable to recover flavour from the aqueous phase that is separated from the organic phase in the final retentate. This recovery can be by reverse osmosis or other techniques but preferably is by fractional distillation, and generally it is necessary to collect only the early, or the early to middle, distillate fractions. Thus it is generally desirable to collect not more than the first 70%, and generally not more than the first 40% of the distillate from the separated aqueous phase. The collected distillate is itself a useful flavour concentrate that can be a novel concentrate according to the invention, or it can be blended with the organic phase that phase separates from the final retentate.

The aqueous permeate from the reverse osmosis process or processes will also contain some flavour chemicals and it can be desirable to recover these. This can be done by passing the permeate back to the start of the process or by subjecting it to reverse osmosis or by distilling it and collecting the early distillate, generally not more than the first 20% and preferably not more than the first 10%.

The reverse osmosis can be conducted in a single prolonged process but this requires a very large reservoir for the starting distillate since the degree of concentration by reverse osmosis is generally in the range 30 to 100 fold, often 50 to 75 fold. The further concentration by phase separation is generally in the range 5 to 30 fold, often 10 to 20 fold. For instance around 1000 liters of initial "fruit ester" might give around 15 liters of final retentate which then is phase separated to give around 1 liter organic phase and around 14 liters of concentrated aqueous phase. It is generally more efficient and convenient to do the reverse osmosis in at least two stages, in which event any valuable flavour chemicals in the aqueous permeate from the first stage, which are preferably recovered by distillation with the early distillate being collected. The permeate from the second and subsequent stages may be recycled or may be subjected to further reverse osmosis in order to recover any flavour chemicals.

The most convenient and efficient procedure is to do the reverse osmosis in a first stage in a plurality of batches, to combine the retentates from these batches to form a feed for a second stage, and then to collect the retentates from a plurality of these second stage batches to form the feed for a third stage, which produces a retentate that is then subjected to the phase separation.

Figure 1:
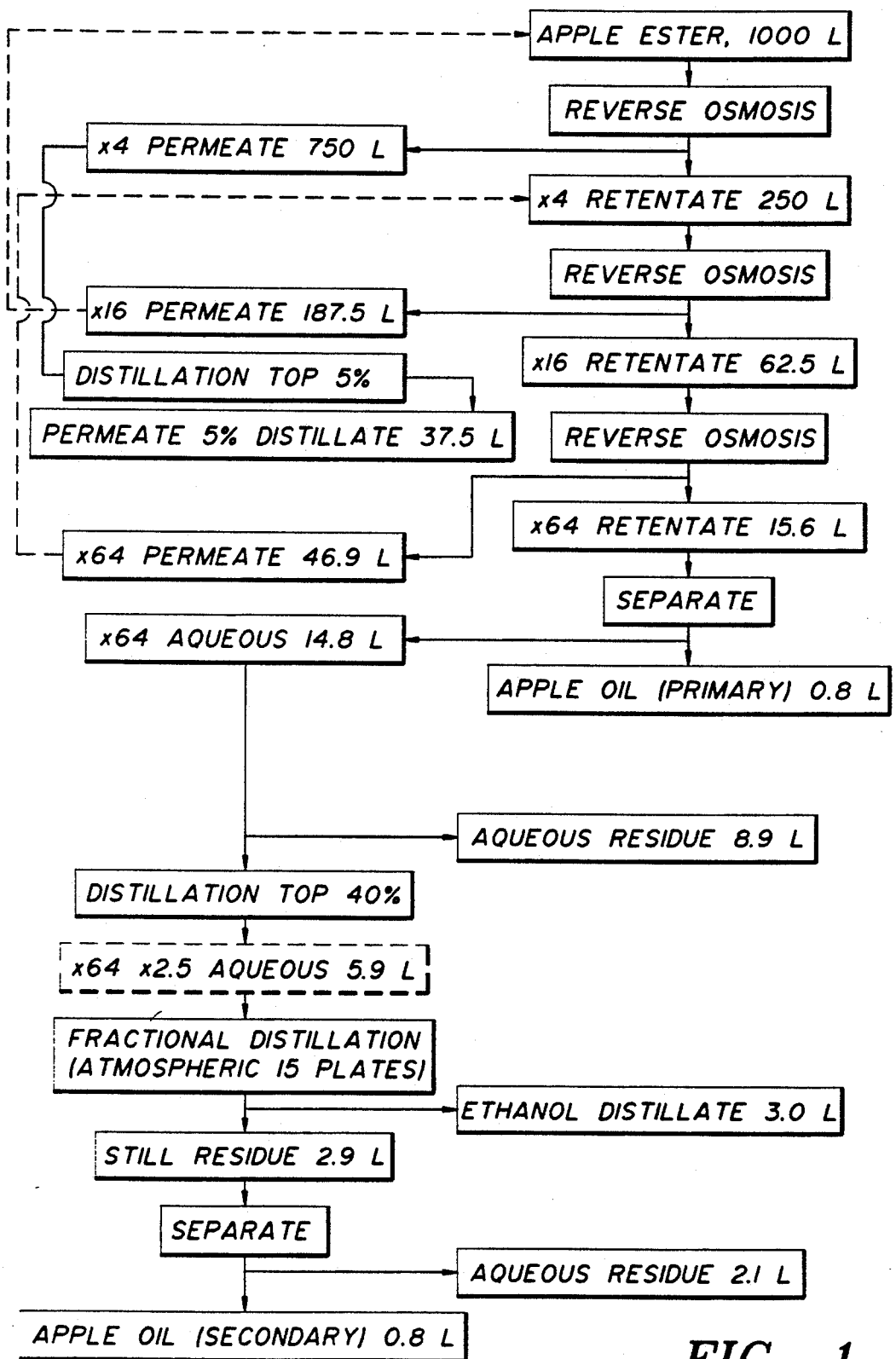
FIG. 1 is a diagrammatic representation of an example of the concentration stages of apple ester in accordance with the invention, showing overall quantities. The broken lines indicate where recycling is advantageous.
Figure 2:
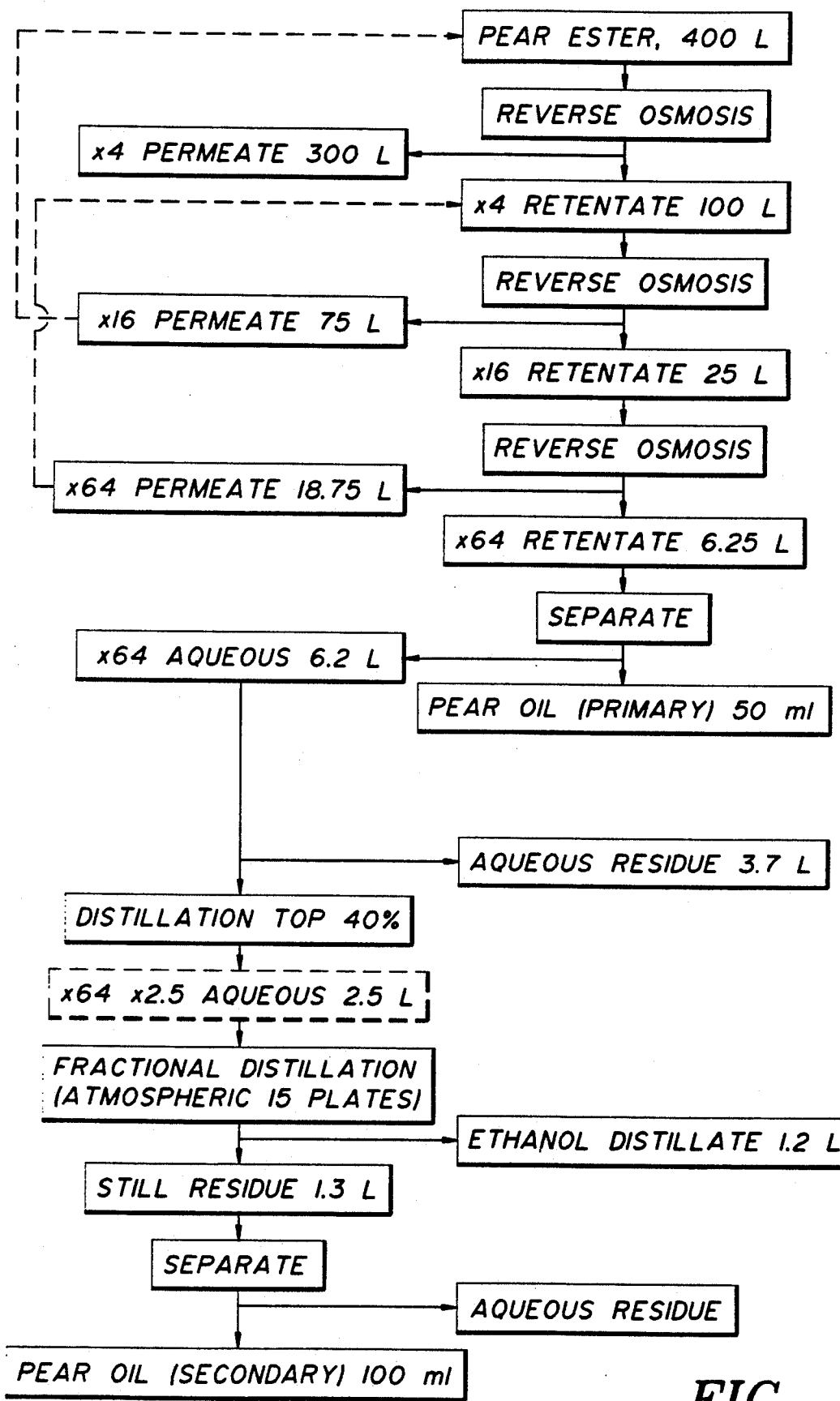
FIG. 2 is a diagrammatic representation of an example of the concentration stages in concentrating pear ester in accordance with the invention, showing overall quantities. The broken lines indicate where recycling is advantageous.

The following is an example.

EXAMPLE 1

A 1000 liter batch of commercial "apple ester" was separated into five 200 liter batches and each batch was concentrated by reverse osmosis. The equipment used comprised two modules each 1.3 meters and containing 18 membrane tubes with a polyamide coating and having a nominal molecular weight cut off of 100 Daltons. The 36 membrane tubes were connected in series and pressurised to 70 bar in order to achieve satisfactory reverse osmosis.

The first 200 liter batch of "apple ester" was circulated in the reverse osmosis plant in a first stage until the volume of retentate was reduced to 50 liters (4-fold concentration). The permeate (150 liters) was stored for subsequent distillation in order to recover the acetaldehyde.

In a second stage, reverse osmosis was continued until the retentate was reduced to 12.5 liters of 16-fold concentration. The remaining 37.5 liters of permeate from this stage was recycled by combining with the second 200 liter batch of "apple ester" for 16-fold concentration in a similar manner. Again the permeate from this second 16 fold concentration was recycled by mixing with the third 200 liter batch of "apple ester" before concentration.

In a third stage, 25 liter portions of the 16-fold concentrate were reduced by reverse osmosis to 6.25 liters (64-fold concentration). A small quantity of oil was separated out at this stage and was decanted off.

The remaining 18.75 liters from each portion of the 16 fold permeate from this third stage was combined with the subsequent 25 liters of 16-fold concentrate to be further concentrated to approximately 64-fold concentration.

The 64-fold concentrated retentate was displaced from the inside of the tubular membrane using the third stage permeate. When all 1000 liters of "apple ester" had been processed in this way to give a 64-fold concentrated retentate, phase separation occured. The oil phase was decanted off. The remaining 14.8 liters of aqueous portion was subjected to a simple distillation at atmospheric pressure to recover the first 40% of distillate. This distillate could be used without further concentration, but in the example was fractionally distilled to recover a further quantity of oil. Using a 15 plate column the ethanol was preferentially removed leaving a residue of from which a further phase separation produced 0.8 liters of apple oil. The resultant total yield of highly concentrated apple oil was 1.6 liters representing a 625 fold overall concentration.

The permeate from the first stages of the reverse osmosis were combined (750 liters) and subjected to simple atmospheric distillation to recover the first 5% of distillate. This distillate contained 2% acetaldehyde and was set aside for use in natural flavour formulations.

EXAMPLE 2

400 liters of commercial "pear ester" was concentrated by reverse osmosis, as described in example 1, until it was reduced to a volume of 6.25 liters.

Phase separation of the retentate then produced 50 ml of oil which was decanted off. The remaining aqueous phase was distilled and a further 100 ml oil was obtained, giving a total yield of 150 ml of highly concentrated pear oil representing a 2667-fold concentration.

We claim:

1. A process for preparation of a natural flavour concentrate comprising flavour chemicals derived from a fruit or vegetable juice distillate comprising subjecting the distillate to reverse osmosis characterised in that the distillate is substantially free of saccharide and reverse osmosis is continued until a retentate is obtained that can phase separate, the rententate is phase separated into an aqueous phase and a substantially anhydrous organic phase which contains a high proportion of the flavour chemicals, and the organic phase is recovered.

2. A process according to claim 1 in which the distillate is of apple or pear juice.

3. A process according to claim 2 in which the reverse osmosis is conducted in at least two stages and the permeate from the second and subsequent stages is recycled to an earlier reverse osmosis stage.

4. A process according to claim 3 in which the distillate is concentrated in the first stage to 50-75 fold, and in the second stage to 5-30 fold.

5. A process according to claim 4 in which the reverse osmosis concentration of the distillate is carried out until the phase separation of the retentate occurs substantially spontaneously.

6. A process according to claim 5 in which the reverse osmosis is conducted using a membrane having a cut-off at or below 150 Dalton.

7. A process according to claim 6 in which the reverse osmosis is carried out at a pressure of from 50-75 bar.

8. A process according to claim 7 in which the temperature of the distillate and all retentate is maintained below 60° C.

9. A process according to claim 8 in which the aqueous phase that is separated from the organic phase of the retentate is fractionally distilled and the early fractions up to not more than 70% of the distillate are collected.

10. A natural flavour concentrate prepared by the process of claim 8.

11. A natural flavour concentrate prepared by the process of claim 9.

12. A natural flavour concentrate prepared by the process of claim 1.

13. A natural concentrate derived by concentration of a fruit or vegetable juice distillate, which is substantially free of saccharide and upon dilution is substantially the flavour of the original juice, the concentrate comprising below 25% by weight water, 10-30% $C_{1-4}$ alcohols and aldehydes and 50–80% organic chemicals having at least 5 carbon atoms.

14. A natural concentrate according to claim 13 derived from apple or pear juice distillate.

15. A concentrate according to claim 14 in which the saccharide content is below 5%.

16. A natural concentrate according to claim 15 in which the saccharide content in the distillate is below 0.05% by weight.

17. A natural concentrate according to claim 16 in which the saccharide content in the distillate is below 0.01% by weight.

18. A concentrate according to claim 15 in which the saccharide content is below 1% by weight of the concentrate.

19. A natural concentrate according to claim 13 wherein the organic chemicals having at least 5 carbon atoms are members selected from the group consisting essentially of aldehydes, alcohols and esters.

* * * * *